(12) United States Patent
Winston et al.

(10) Patent No.: US 11,176,081 B2
(45) Date of Patent: Nov. 16, 2021

(54) PARALLEL, DISTRIBUTED PROCESSING IN A HETEROGENEOUS, DISTRIBUTED ENVIRONMENT

(71) Applicant: Halliburton Energy Services, Inc., Houston, TX (US)

(72) Inventors: Joseph Blake Winston, Houston, TX (US); Scott David Senften, Sugar Land, TX (US); Keshava Prasad Rangarajan, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 468 days.

(21) Appl. No.: 16/075,451

(22) PCT Filed: Jun. 23, 2016

(86) PCT No.: PCT/US2016/039051
§ 371 (c)(1),
(2) Date: Aug. 3, 2018

(87) PCT Pub. No.: WO2017/222533
PCT Pub. Date: Dec. 28, 2017

(65) Prior Publication Data
US 2021/0209055 A1    Jul. 8, 2021

(51) Int. Cl.
*G06F 9/54* (2006.01)
*G06F 15/80* (2006.01)

(52) U.S. Cl.
CPC .............. *G06F 15/80* (2013.01); *G06F 9/546* (2013.01)

(58) Field of Classification Search
None
See application file for complete search history.

(56) References Cited

U.S. PATENT DOCUMENTS 5,941,969 A * 8/1999 Ram .................... G06F 13/4004
710/315
6,496,863 B1 * 12/2002 Palmer .................... H04L 29/06
709/224

(Continued)

FOREIGN PATENT DOCUMENTS

EP          2960789 A2    12/2015
WO    WO 2005/067432 A2    7/2005

OTHER PUBLICATIONS

Extended Search Report issued for European Patent Application No. 16906455.7, dated Dec. 10, 2019, 8 pages.

(Continued)

*Primary Examiner* — Michael Sun
(74) *Attorney, Agent, or Firm* — Haynes and Boone, LLP

(57) ABSTRACT

Various embodiments include systems and methods of operating the systems that include operation of a plurality of first nodes and second nodes in response to a request, where each first node is a first type of processing unit and each second node is a second type of processing unit, where the second type of processing node is different from the first type of processing node. Each of the first and second nodes can be operable in parallel with the other nodes of their respective plurality. Each second node may be operable to respond to the request using data and/or metadata it holds and/or operable in response to data and/or metadata from one or more of the first nodes. Additional apparatus, systems, and methods are disclosed.

18 Claims, 10 Drawing Sheets

(56) References Cited

U.S. PATENT DOCUMENTS

| | | | |
|---|---|---|---|
| 7,062,537 B2 | 6/2006 | Aziz et al. | |
| 7,890,572 B2 | 2/2011 | Goodman et al. | |
| 9,432,298 B1 * | 8/2016 | Smith | H04L 49/9057 |
| 9,753,767 B2 * | 9/2017 | Rausch | G06F 9/4843 |
| 2001/0051956 A1 | 12/2001 | Bird | |
| 2008/0281801 A1 | 11/2008 | Larson et al. | |
| 2010/0005472 A1 | 1/2010 | Krishnaraj et al. | |
| 2013/0132967 A1 | 5/2013 | Soundararajan et al. | |
| 2015/0277802 A1 * | 10/2015 | Oikarinen | G06F 3/061 |
| | | | 711/114 |
| 2015/0278243 A1 * | 10/2015 | Vincent | G06F 16/182 |
| | | | 707/634 |
| 2015/0280959 A1 * | 10/2015 | Vincent | G06F 3/0622 |
| | | | 709/203 |

OTHER PUBLICATIONS

International Search Report and The Written Opinion of the International Search Authority, or the Declaration, dated Mar. 21, 2017, PCT/US2016/039051, 11 pages, ISA/KR.

* cited by examiner

PARALLEL, DISTRIBUTED PROCESSING IN A HETEROGENEOUS, DISTRIBUTED ENVIRONMENT

PRIORITY

The present application is a U.S. National Stage patent application of International Patent Application No. PCT/US2016/039051, filed on Jun. 23, 2016, the benefit of which is claimed and the disclosure of which is incorporated herein by reference in its entirety.

TECHNICAL FIELD

The present invention relates generally to apparatus and methods related to enhanced data processing and applications thereof.

BACKGROUND

A number of scalable system design pattern-based systems can provide techniques for implementing a distributed, parallel compute/visualization environment. Examples of such systems include, but are not limited to, MapReduce (MR), Iterative MapReduce (IMR), Streaming MapReduce (SMR), Scatter/Gather (SG) (Message Passing Interface (MPI) implementations fall into this world of distributed, parallel computing), and Bulk Synchronous Processing (BSP). Most scalable system design pattern-based systems like MR, IMR, SMR, SG, and BSP operate, typically, in a homogenous hardware and software environments that limit utilization of resources such as graphic processing units (GPUs), field-programmable gate arrays (FPGAs), or even different central processing unit (CPU) architectures for either compute or visualization. Such scalable system design pattern-based systems may be batch, micro-batch, or streaming. Typically, a simple extract, transform, and load (ETL) pattern is used to address such a limitation at each boundary between the two different systems, but the very nature of extracting typically deals with two separate data pipelines introduces inefficiencies into the system.

DETAILED DESCRIPTION

The following detailed description refers to the accompanying drawings that show, by way of illustration and not limitation, various embodiments that may be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a single data as well as execution pipeline can be created across a heterogeneous, distributed compute/visualization environment. This structure and associated procedure can provide improvements by eliminating a bulk extract of data, by pushing the control mechanism for all processing on one data pipeline, and by transcending programming language, process, and machine boundaries inherent in heterogeneous environments at a given unit of work. This structure and associate procedure can simplify the programming model, optimize the transport mechanisms, and allow for simpler inclusion of new hardware resources.

A basic process includes a recognition that heterogeneous environments are often considered separate entities, for example, a cluster of CPU nodes being used for general processing and a cluster of GPU nodes, or other nodes such as FPGAs, being used for some specialized processing such as rendering. In the scenario depicted in FIG. 1, data is distributed across some number of nodes of type "A" in some manner as depicted by the "data" 1-J. Data can refer to either or both actual values of samples and any summary regarding data that is data describing data, which is typically referred to as metadata. A different set of requirements can include data distributed in a different manner, depicted as A-N, on a different set of node types, "B" in this case. A typical ETL implementation would either use a secondary storage device, like a network mounted disk, to give both systems access to the entire dataset or would gather and extract the needed pieces on the head node of one system, transfer the block, transform the data, and then load the result back.

Figure 1:
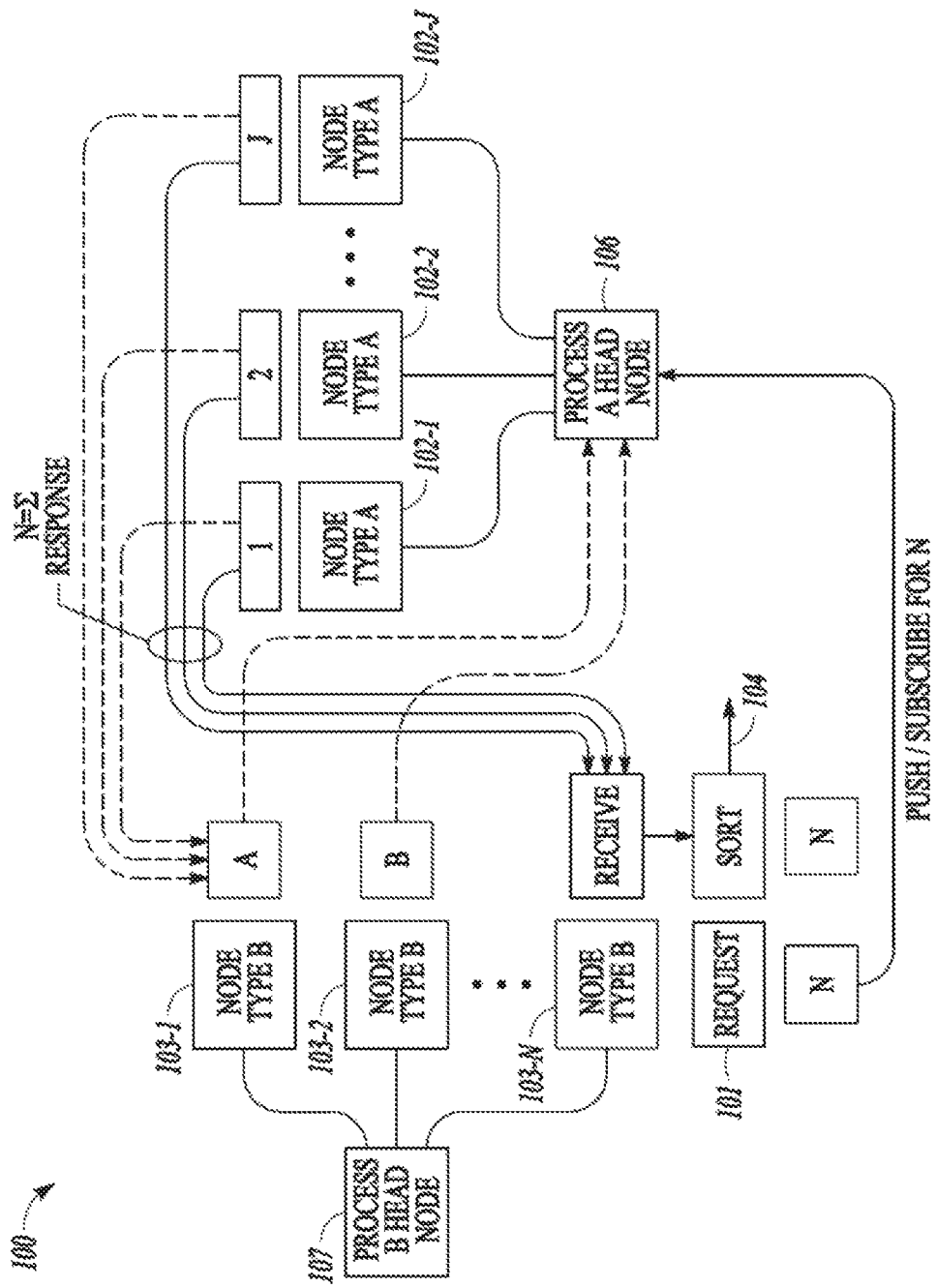
FIG. 1 is a block diagram of an example system architecture that can comprise a request input, a first plurality of first nodes, a second plurality of second nodes, and an output, in accordance with various embodiments.

In FIG. 1, it is recognized herein that the desired data is already distributed and that the requests for the data to be redistributed in some other manner is, inherently, also distributed. Instead of collecting responses at some intermediate point, the power of the distributed system can be used to connect one directly to another. A given redistribution request, a subscription, can be handled by a series of filter and map closures and publishing can be transmitted from where a request is received to the distributed nodes actually holding the needed data. Each distributed node can then respond directly to the request by examining the data and/or metadata it holds against the request and responding with the intersection of the two. The requestor then needs to receive these asynchronous responses and sort the pieces into the appropriate format for the original request. This process, by the nature of its parallel response, has the characteristics of optimizing the distributed processing nature of the system as well as network/transport infrastructure.

It is important to note that the actual transport mechanism of the data with its command is immaterial to the process. One might assume from FIG. 1 that the communication is some standard socket pair, which is one implementation. However, the transport can also be implemented by shared memory, distributed shared memory, a shared file system, or any other mechanism.

FIG. 1 is a schematic representation of an embodiment of an example system 100 that can comprise a request input 101, a first plurality of first nodes 102-1, 102-2 . . . 102-J, a second plurality of second nodes 103-1, 103-2 . . . 103-N, and an output 104. Each first node 102-1, 102-2 . . . 102-J can be a first type of processing unit, where each first node is operable in parallel with the other first nodes of the first plurality. Each first node 102-1, 102-2 . . . 102-J can be operable to respond directly to a request by examining data and/or metadata it holds against the request. Each first node 102-1, 102-2 . . . 102-J can include, respectively, data 1, data 2 . . . data J. Each second node 103-1, 103-2 . . . 103-N can be a second type of processing unit, where each second node can be operable in parallel with the other second nodes of the second plurality. Each second node 103-1, 103-2 . . . 103-N can be operable to respond to the request using data and/or metadata it holds and/or can be operable in response to data and/or metadata from one or more of the first nodes, where the second type of processing node can be different from the first type of processing node. Each second node 103-1, 103-2 . . . 103-N can include, respectively, data A, data B . . . data N. Output 104 can send responses from operation of the first plurality and the second plurality in a format appropriate to respond to the request. The received response from the operation can be a sum of the responses. The received responses from the operation can be sorted into the appropriate format.

The system 100 can include transformations to provide data and/or metadata from the first plurality of first nodes to the second plurality of second nodes. The transformations can include appropriate filters and maps. The system 100 can include a first process head node 106 to coordinate processing of the first plurality of first nodes 102-1, 102-2 . . . 102-J, where the first process head node 106 can be arranged to receive all requests. Such requests can include first requests and other requests from the plurality of second node 103-1, 103-2 . . . 103-N. The system 100 can include a second process head node 107 to coordinate processing of the second plurality of second nodes 103-1, 103-2 . . . 103-N. The non-dashed lines in FIG. 1 refer to a first request and the dashed lines in FIG. 1 refer to another request.

Figure 2:
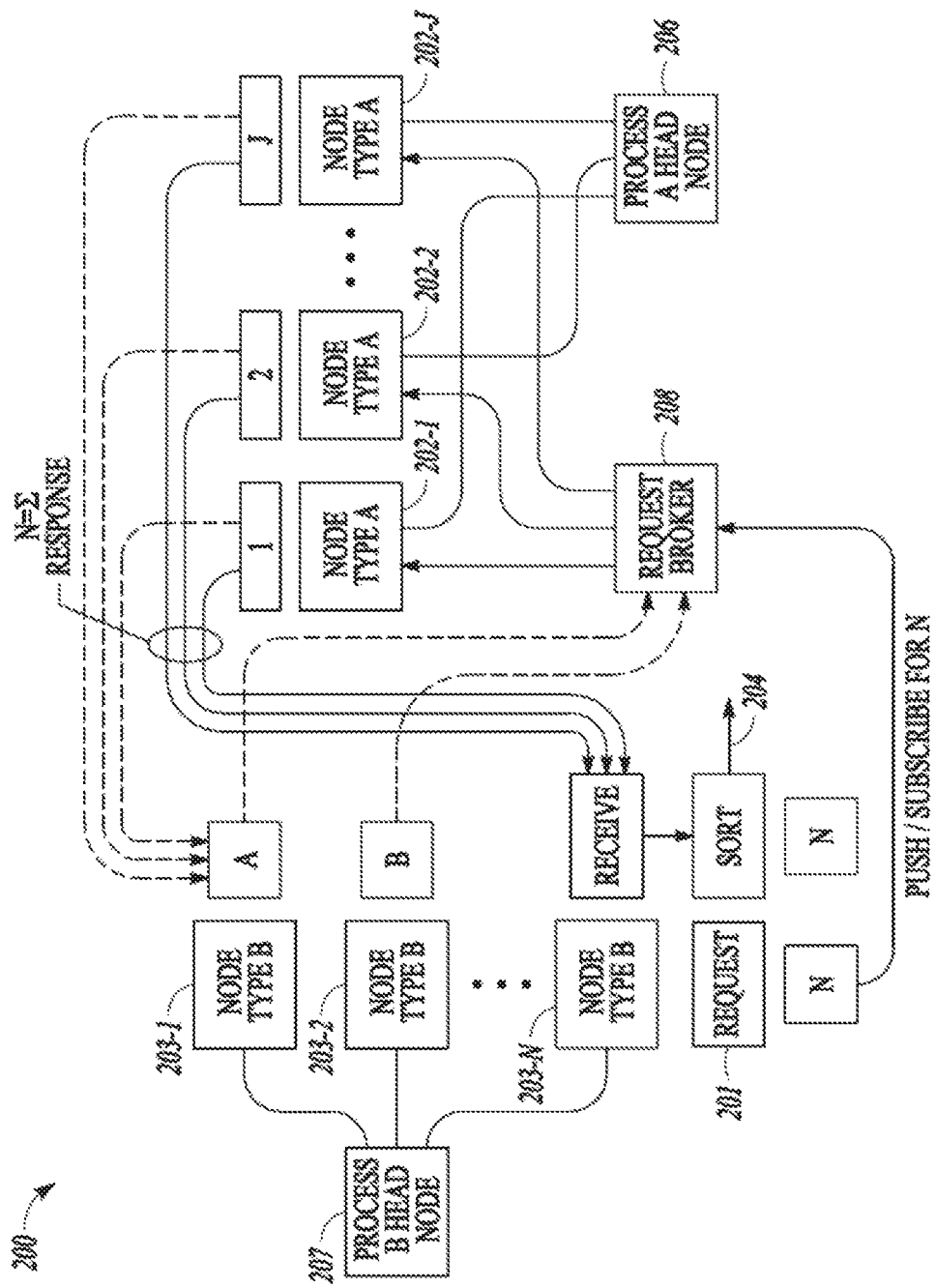
FIG. 2 is an illustration of an example system architecture providing parallel request management, in accordance with various embodiments.

Consider request management derivation. FIG. 2 is an illustration of parallel request management. In the base process shown in FIG. 1, all the requests are funneled to the head node 106. Again, utilizing the nature of the distributed system, a request broker 208 can be inserted, as shown in FIG. 2, and used to redirect requests from request node 201 to the distributed nodes 202-1, 202-2 . . . 202-J. The first node available can receive the request and trigger the master to start the appropriate transformations such as but not limited to filters and maps. This one level of managing direction eliminates explicit knowledge by the processing head node 206 and allows for better load balancing.

The system 200 can include first process head node 206 to coordinate processing of the first plurality of first nodes 202-1, 202-2 . . . 202-J; a second process head node 207 to coordinate processing of the second plurality of second nodes 203-1, 203-2 . . . 203-N; and a request broker node 208 to receive the request from the second plurality of second nodes 203-1, 203-2 . . . 203-N and to provide the request to the first plurality of first nodes 202-1, 202-2 . . . 202-J. A first node of the first plurality of first nodes 202-1, 202-2 . . . 202-J can be arranged such that a first available first node to receive the request from the request broker node 208 is operable to trigger the first process head node 206 to start appropriate transformations with respect to respond to the request. The non-dashed lines in FIG. 2 refer to a first request and the dashed lines in FIG. 2 refer to another request. Responses from operation of the first plurality and the second plurality can be output in a format appropriate to respond to the request. The received response from the operation can be a sum of the responses.

Consider resiliency on the client derivation. Resilience is the ability of a network to provide and maintain an acceptable level of service in the occurrence of various faults and challenges to normal operation. On the processing side of FIG. 2, the transformations can be implemented in such a way that their calculations are resilient. This is an important notion to distributed processing due to the high likelihood of errors either across the network or in one of the many distributed nodes. Recovering from failure state is an important feature of a distributed architecture. Implementing the processing with a framework like Apache Spark™, which provides a resiliency in calculations, can provide an important feature.

No less important, but normally not considered in heterogeneous environments, is resiliency on the request side. In the previous sections, filters and maps of a publishing function can be implemented with a technique such as Apache Spark resilient distributed datasets (RDDs) in a typical usage of RDDs representing data. From a high level perspective, this allows for recovery of any one request, but, remembering that the goal is to unify a data pipeline in a heterogeneous environment, the actual desire is to redistribute the data for some specialized processing, like rendering. From that perspective, there is no easy way to recover from failure on the subscribing side. By encoding the total description of the redistribution on the subscribing side as an RDD or another mechanism such as Akka, the entire redistribution can recover from error and be easily rerun.

Figure 3:
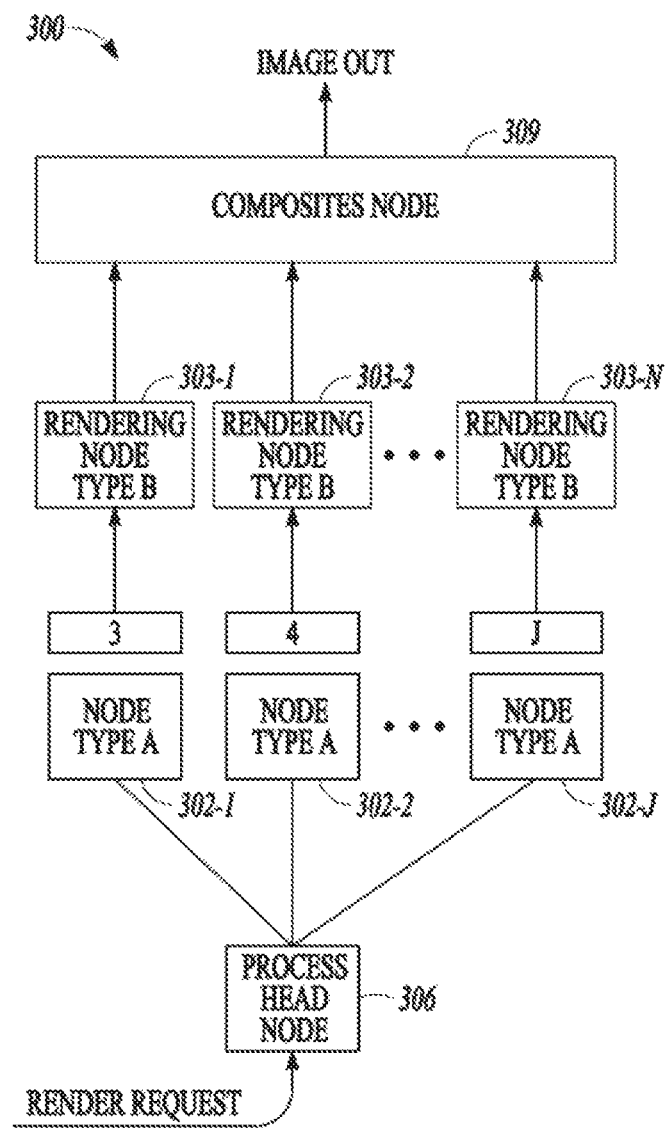
FIG. 3 is a block diagram of an example system illustrating specialized backend processing, in accordance with various embodiments.

Consider rendering as a service derivation. The publish and subscribe (pub-sub) nature of the previous derivations makes the subscription side, effectively, a client of the publishing side. This is a characterization of a pub-sub pattern, but, while taking advantage of both the distributed nature of the subscription and publishing and behaving as a unified data pipeline, ultimately, it is still implemented as a pub-sub. FIG. 3 is a block diagram of an embodiment of an example system illustrating specialized backend processing. In FIG. 3, the pub-sub pattern is replaced so that the distribution of the processing piece is either directly rendered in a heterogeneous environment or the redistribution occurs in a truly unified manner. The result is that the distributed nature of the processing side is utilized directly.

FIG. 3 illustrates an example system 300 that provides a specific arrangement of a first plurality of first nodes 302-1, 302-2 . . . 302-J and a second plurality of second nodes

303-1, 303-2 ... 303-N. The system 300 can include a first process head node 306 arranged to coordinate processing of the first plurality of first nodes 302-1, 302-2 ... 302-J and to receive the request and distribute the request to selected first nodes of the first plurality of first nodes 302-1, 302-2 ... 302-J. Selected second nodes of the second plurality of second nodes 303-1, 303-2 ... 303-N can be arranged to receive data and/or metadata from the selected first nodes 302-1, 302-2 ... 302-J. The system 300 can include a composite node 309 to generate an output from compositing results of operation of the selected second nodes 303-1, 303-2 ... 303-N. Each of the selected second nodes 303-1, 303-2 ... 303-N can be arranged in a one-to-one relationship with a respective selected first node, which can be viewed as J=N. With the second plurality of second nodes 303-1, 303-2 ... 303-N being rendering nodes, the composite node 309 can output an image. The image can be directly output from the composite node 309.

In this derivation, by pushing the rendering request to the data side and jumping either or both the language and machine node boundaries at the processing node level, the specialized processing case, rendering in this derivation, becomes a service of the processing instead of a client. In this manner, if a differing distribution was needed or desired for a particular type of rendering, the redistribution of the data (aka shuffle) could happen in the same manner that any calculation needed a differing distribution would do so as shown in FIG. 6.

Figure 4:
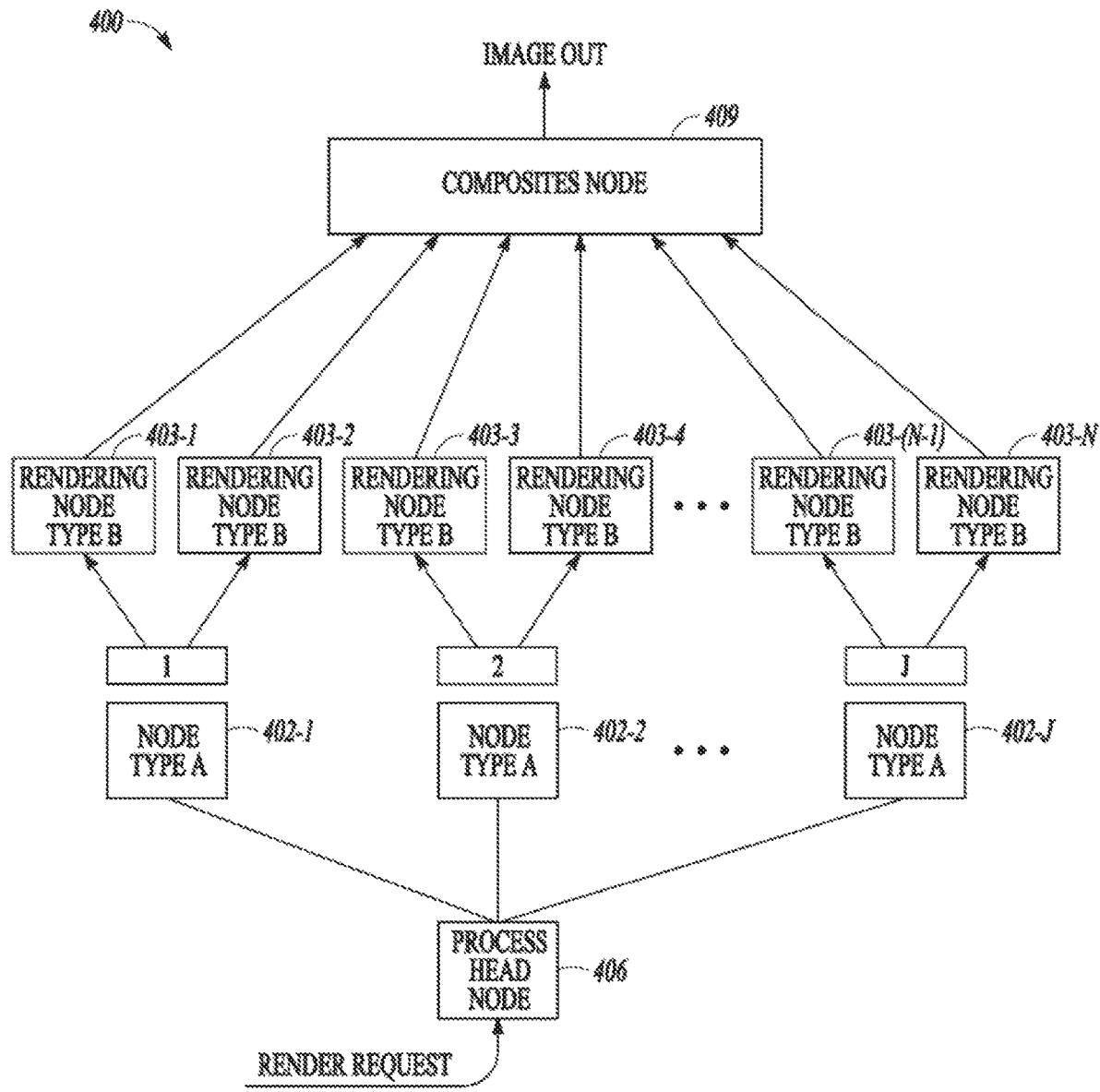
FIG. 4 is a block diagram of an example system illustrating a specialized backend processing system having a single type A node feeding multiple type B nodes, in accordance with various embodiments.

Two variations of FIG. 3 are possible. One variation is shown in FIG. 4, where FIG. 4 is a block diagram of an example embodiment of a specialized backend processing system 400 having a single type A node feeding multiple type B nodes. The division of labor between the two types is based on some cost function. The system 400 can include selected second nodes 403-1, 403-2 ... 403-(N–1), 403-N distributed in a plurality of sets of selected second nodes. As shown, the second nodes 403-1, 403-2 ... 403-(N–1), 403-N can be distributed as a number of sets having two node types B. Though shown as sets of two node type Bs, the sets can include more than two node type Bs. In addition, each set need not have the same number of node type Bs. In an embodiment, at least one set of the plurality of sets arranged from selected second nodes 403-1, 403-2 ... 403-(N–1), 403-N can have a plurality of selected second nodes, that is, two or more node types B. Each set of selected second nodes can be arranged in a one-to-one relationship with a respective selected first node of the plurality of nodes 402-1, 402-2 ... 402-J of type A node. Outputs from each set of the plurality of sets of selected second nodes 403-1, 403-2 ... 403-(N–1), 403-N can be provided to composite node 409 that can output an image. The image can be directly output from the composite node 409.

Figure 5:
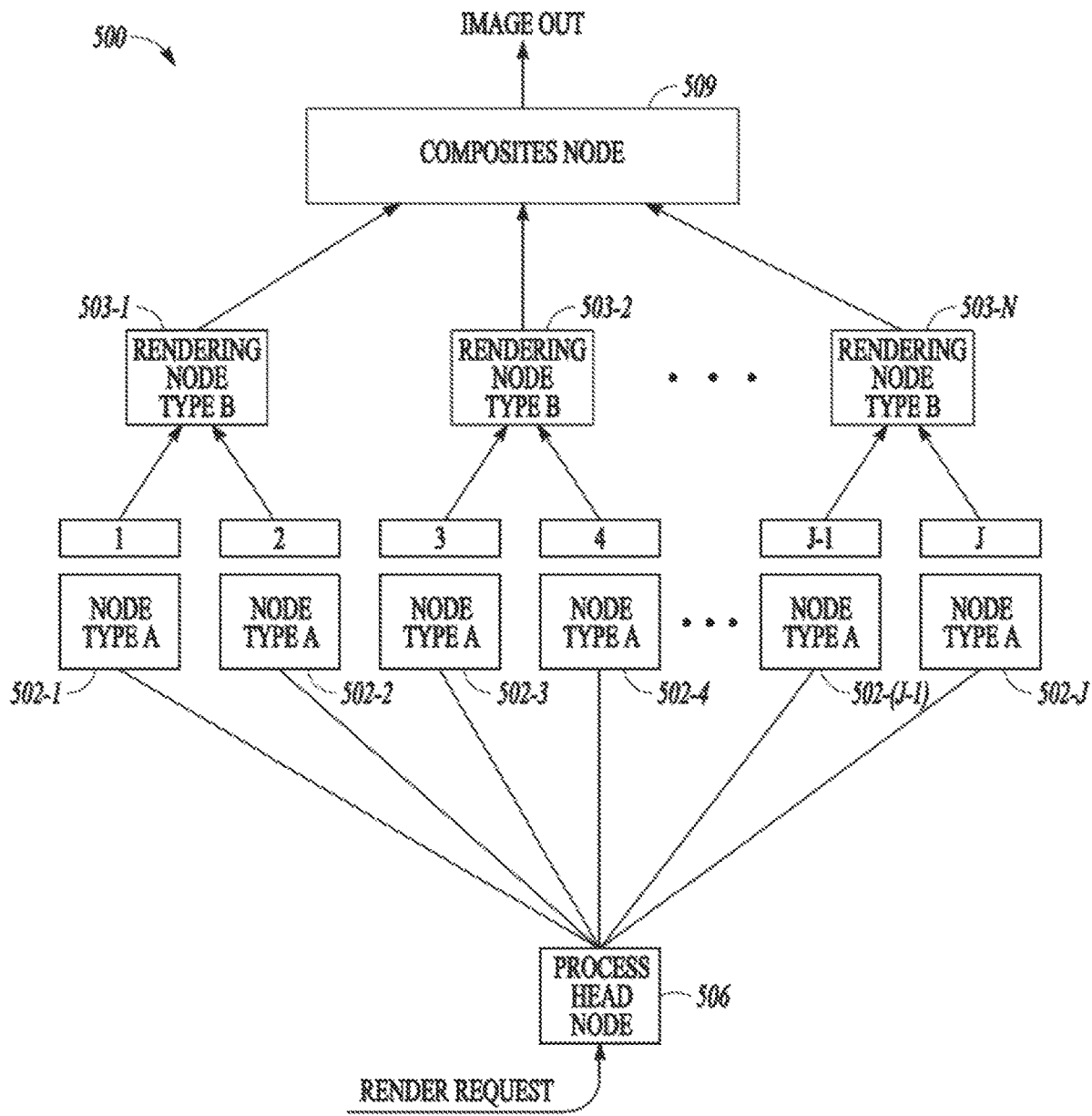
FIG. 5 is a block diagram of an example system illustrating a specialized backend processing system having multiple type A nodes feeding a single type B node, in accordance with various embodiments.

The other variation is found in FIG. 5, where FIG. 5 is a block diagram of an example system illustrating a specialized backend processing system 500 having multiple type A nodes feeding a single type B node. Here, there are multiple type A nodes that provide information to a smaller number of Type B Nodes. The system 500 can include selected first nodes 502-1, 502-2 ... 502-(J–1), 502-J distributed in a plurality of sets of selected first nodes. As shown, the first nodes 502-1, 502-2 ... 502-(J–1), 502-J can be distributed as sets of two node types A. However, the sets can include more than two node types A. Further, each set need not have the same number of node types A. In an embodiment, at least one set of the plurality of sets arranged from selected first nodes 502-1, 502-2 ... 502-(J–1), 502-J can have a plurality of selected first nodes, that is, two or more node types A. Each set of selected first nodes can be arranged in a one-to-one relationship with a respective selected second node of the plurality of nodes 503-1, 503-2 ... 503-N of type B node. Outputs from each of the selected second nodes 503-1, 503-2 ... 503-N can be provided to composite node 509 that can output an image. The image can be directly output from the composite node 509.

Figure 6:
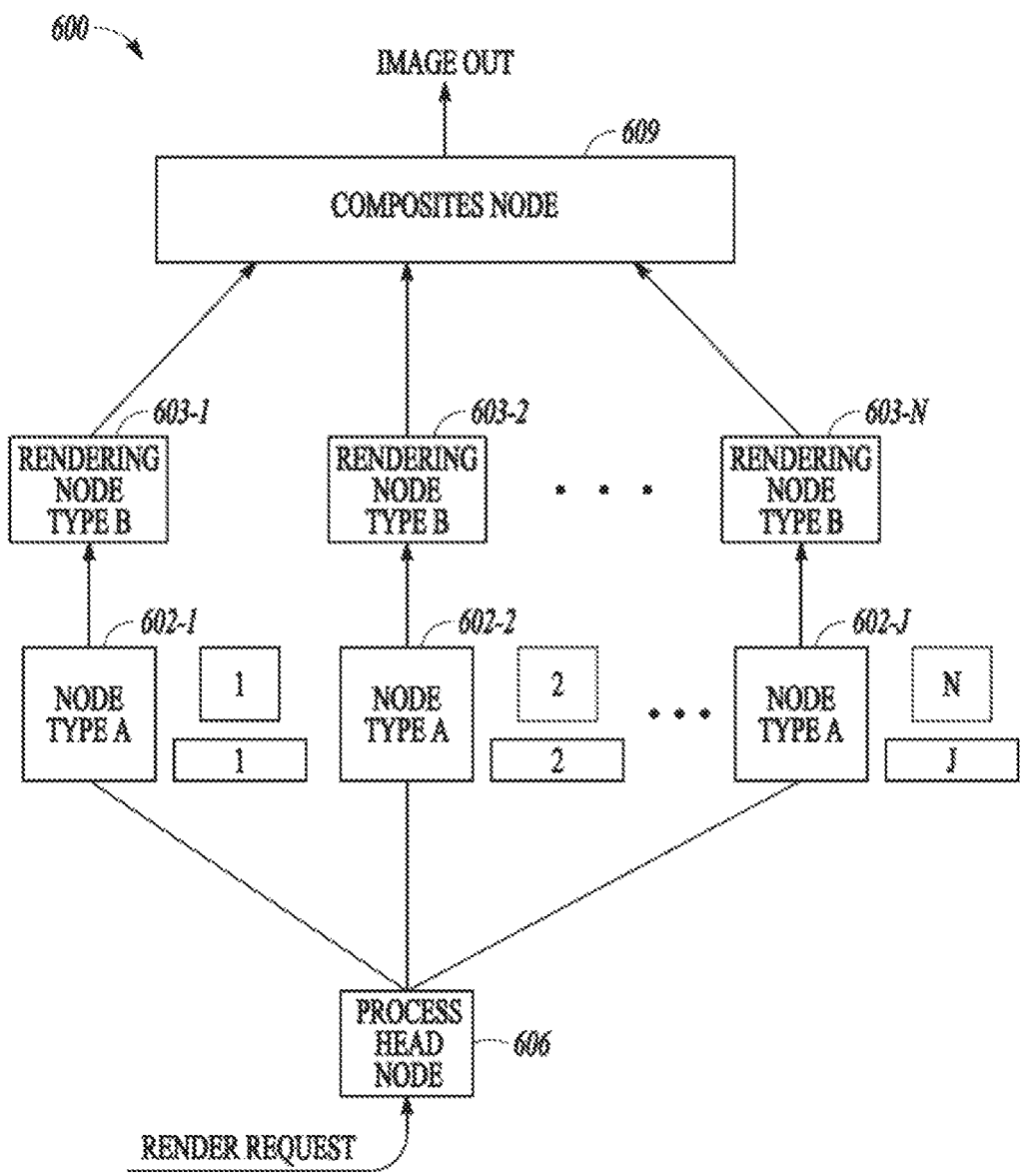
FIG. 6 is a block diagram of an example system illustrating shuffle prior to rendering, in accordance with various embodiments.

FIG. 6 is a block diagram of an embodiment of an example system 600 illustrating shuffle prior to rendering. With this derivation, there is a single unified data pipeline for a heterogeneous compute/visualization environment. In system 600, a render request can be received by process head node 606 that is operatively coupled to first nodes 602-1, 602-2 ... 602-J, which can be nodes of node type A, each node having a respective data set 1, 2, ... J. The first nodes 602-1, 602-2 ... 602-J can be operatively coupled to second nodes 603-1, 603-2 ... 603-N, which can be nodes of type B node that may be realized as rendering nodes. Each selected first node 602-1, 602-2 ... 602-J can be arranged with a respective data hypercube, 1, 2 ... N different from the data hypercubes of the other selected first nodes and conversion occurs on the selected second nodes 603-1, 603-2 ... 603-N. The second nodes 603-1, 603-2 ... 603-N can be in a one-to-one relationship with the first nodes 602-1, 602-2 ... 602-J. Outputs from each of the second nodes 603-1, 603-2 ... 603-N can be provided to composite node 609 that can output an image. The image can be directly output from the composite node 609.

Figure 7:
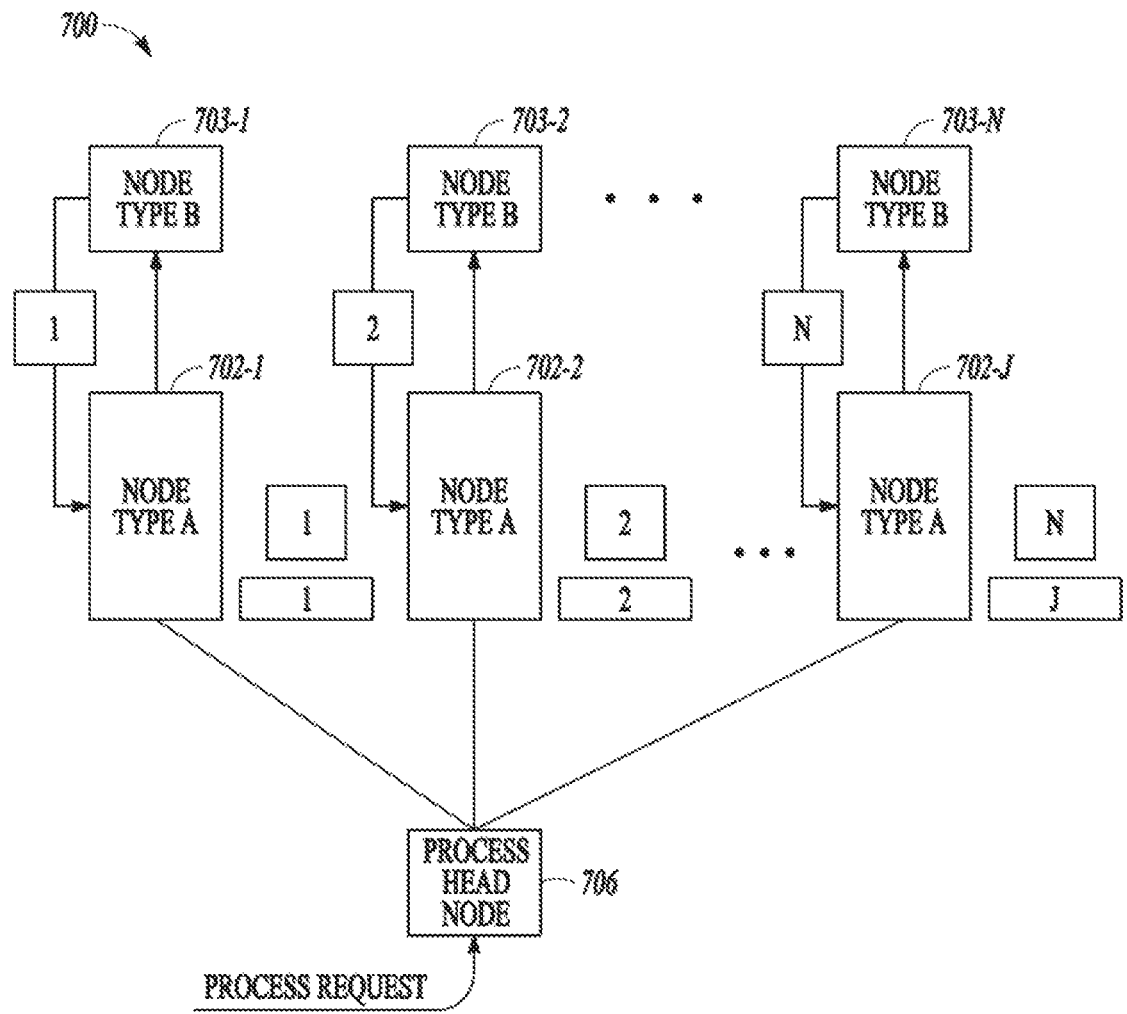
FIG. 7 is a block diagram of an example of a unified pipeline for specialized compute, in accordance with various embodiments.

Consider a specialized compute derivation. Rendering represents a particular type of processing that can be considered a sink, meaning that the result of the rendering, the images, is consumed outside of the framework. This allows for a few simplifications, most notably, where the communication across to the specialized processors is largely one-way, out. By generalizing this mechanism, this unified data pipeline can be used not only for rendering but also for processing that requires or would benefit from specialized processing hardware. FIG. 7 shows this derivation, where FIG. 7 is a block diagram of an embodiment of an example of a unified pipeline for specialized compute. In system 700, a render request can be received by process head node 706 that is operatively coupled to first nodes 702-1, 702-2 ... 702-J, which can be nodes of node type A, each node having a respective data set 1, 2, ... J. The first nodes 702-1, 702-2 ... 702-J can be operatively coupled to second nodes 703-1, 703-2 ... 703-N, which can be nodes of type B node. Each selected first node 702-1, 702-2 ... 702-J can be arranged with a respective data hypercube, 1, 2 ... N different from the data hypercubes of the other selected first nodes. The second nodes 703-1, 703-2 ... 703-N can be in a one-to-one relationship with the first nodes 702-1, 702-2 ... 702-J. Each selected second node 703-1, 703-2 ... 703-N can be arranged to provide a respective selected first node 702-1, 702-2 ... 702-J to which it is in the one-to-one relationship with a data hypercube resultant from operation of the respective selected second node 703-1, 703-2 ... 703-N. The result show in FIG. 7 can also include an image output as illustrated in FIG. 6.

Distributed rendering is inherently a render-composite operation, which can be mapped to a MapReduce pattern, but the result is a specialized dimensional reduction, an image. This derivation shows a process for utilizing specialized processing, but having the result maintained as if it were performed in the exact same manner as the base nodes, i.e. the result could be an another Spark RDD or an equivalent mechanism as would be expected from the output of a map( ) function call. To do so, the communication path out is mirrored on the return and each distributed result is presented back as an element of the new RDD. The process goes beyond mimicking a unified pipeline and actually constructs one.

Consider a unified compute derivation. If the closure for the MapReduce is implemented in such a way that it can execute on the given computational resource, whether it is a CPU or GPU, a FGPA, or any other device that can perform a calculation, then one achieves a unified computational pipeline. One approach could be to have the same languages such as Java run everywhere. Unfortunately, Java and other languages that use virtual machines, which could be run on all machines that can perform calculations, do not exist. However, there are two possible approaches that are variants on Domain Specific Languages (DSLs). One is to use a DSL in the closure itself that describes completely the work the closure must perform. Here, at runtime, the DSL is translated into the appropriate language for the computational device at the last possible moment. The other approach is to take the DSL and compile it to all the possible targets, such as CPU and/or GPU and/or FPGA for example, ahead of time (AOT), and then use the results of this AOT compilation on the correct resource to execute the program. The latter case has simpler deployment mechanisms, since the compilation section of the language need not be distributed as part of the runtime deployment.

Figure 8:
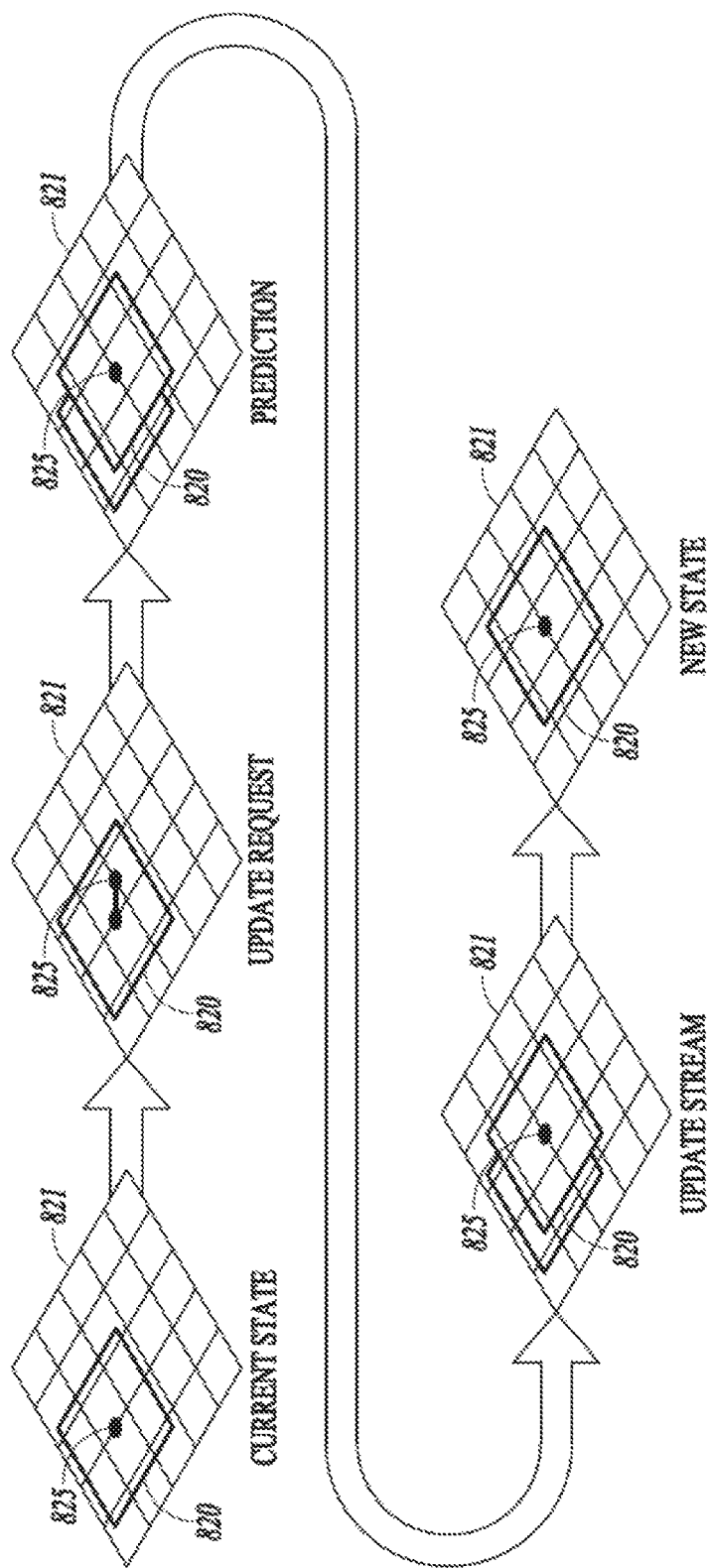
FIG. 8 is representation of a moving window in a two dimensional grid in streaming update including a prediction process, in accordance with various embodiments

Consider predictive streaming update derivation. FIG. 8 is a representation of a moving window 820 in a two dimensional (2D) grid in streaming update including a prediction process. The 2D grid contains an area of interest 825 that also can have some adjacency information. The moving window 820 and the area of interest 825 change from a current state at 821 to a new state 828 from processing after arrival of an update request at 822. From the update request 822, a prediction is generated at 824, which is then streamed as an update at 826. The streamed update provides the new state 824. This scenario of moving a region for a calculation holds in lower as well as higher dimensional space. For example, in a 3D space, the area of interest is a cube.

Figure 9:
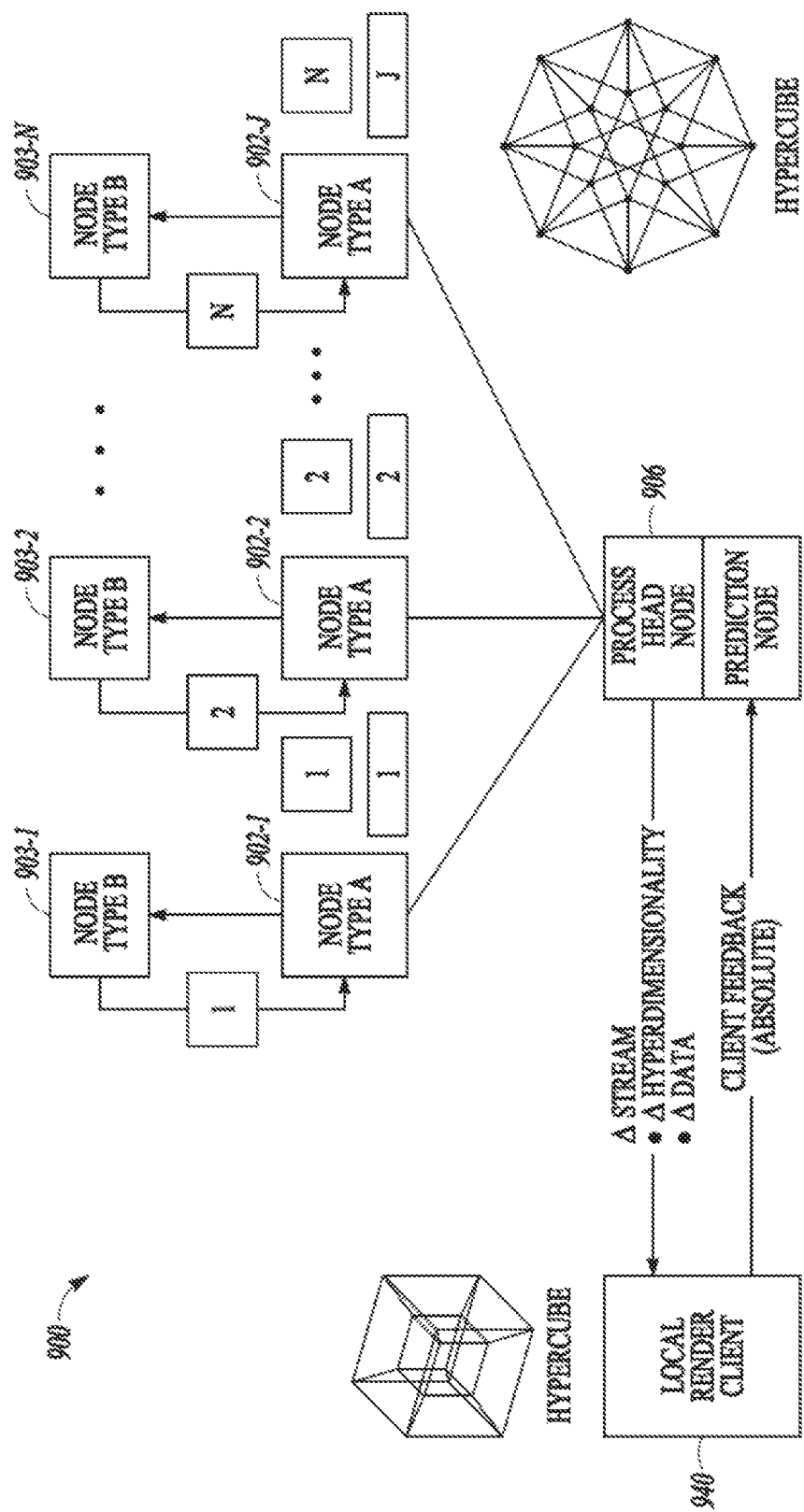
FIG. 9 is a block diagram of an example system with predictive streaming, in accordance with various embodiments.

FIG. 9 is a block diagram of an embodiment of an example system 900 with predictive streaming. Process head node 906 is operatively coupled to first nodes 902-1, 902-2 . . . 902-J, which can be nodes of node type A, each node having a respective data set 1, 2, . . . J. The first nodes 902-1, 902-2 . . . 902-J can be operatively coupled to second nodes 903-1, 903-2 . . . 903-N, which can be nodes of type B node. Each selected first node 902-1, 902-2 . . . 902-J can be arranged with a respective data hypercube, 1, 2 . . . N different from the data hypercubes of the other selected first nodes. The second nodes 903-1, 903-2 . . . 903-N can be in a one-to-one relationship with the first nodes 902-1, 902-2 . . . 902-J. Each selected second node 903-1, 903-2 . . . 903-N can be arranged to provide a respective selected first node 902-1, 902-2 . . . 902-J to which it is in the one-to-one relationship with a data hypercube 1, 2, . . . N that is resultant of prediction of need.

The system 900 can be arranged as a server-side distributed system including the process head node 906 arranged to coordinate processing of the first plurality of first nodes 902-1, 902-2 . . . 902-J. The process head node 906 can be arranged with respect to a predictive model of an N-dimensional hypercube of data and/or metadata, where the N-dimensional hypercube of data and/or metadata can be distributed among the first nodes of the first plurality of first nodes 902-1, 902-2 . . . 902-J. The process head node 906 can stream, to a client 940, a delta of hyper dimensionality and/or delta of data and/or metadata with respect to a hypercube of data and/or metadata stored in the client 940. The client 940 may be a local render client. The delta can be a difference between what the client has and what the client needs. The delta can be based on hypercubes of data and/or metadata provided by operation of the plurality of second nodes second nodes 903-1, 903-2 . . . 903-N in response to mapping from the plurality of first nodes 902-1, 902-2 . . . 902-J. The process head node 906 can be arranged to receive feedback from the client 940 as input to the predictive model to operatively reduce the dimensionality of the N-dimensional hypercube of data and/or metadata based on the feedback. The client feedback may be taken as absolute. The N-dimensional hypercube on the server-side can be equal to or larger than the hypercube stored on the client.

There are a number of good reasons to have some amount of information managed at a client. Latency is the most obvious. A further derivation is to use a server-side distributed system as a predictive model of an N-dimensional hypercube of data. Based on client-side feedback, the predictive model reduces the dimensionality its hypercube and subsets the result down to a delta ($\Delta$) that will be needed by the client for it to continue to respond to user requests. This delta can be streamed to the client for consumption. This delta, the difference between what the client has and what is needed, is the only set of the entire dataset sent by the service.

It is important to note the predictive model can be created via deep learning, machine learning, or programmatic heuristics. In the case of a learning model, the model would be continuously updated based on the client feedback. The N-dimensional hypercube on the server-side is equal to or larger than the hypercube stored on the client. The method will work for any value of N. Part of the predictive model includes determining the dimensionality of the hypercube needed by the client. For instance the predictive model may determine that a new type of data will be needed by the client, which would add a dimension to the client's hypercube. Part of the predictive model can include determining the data needed to populate or update the client hypercube. For instance, if the client is roaming through the entire dataset, the predictive model would determine where the user is going and send the appropriate updates prior to the user asking to access that region. This predictive model is not constrained to data model viewing but can be a predictive model of user intent, including process goals.

Statelessness is important so that dropped messages don't introduce cumulative error into the system. Therefore, the client feedback must be "absolute", meaning it must be relative only to some well-known origin for the dimension of the hypercube. Additionally, message compression can occur either client-side or server-side.

The system architectures associated with FIGS. 1-9 can be used as building blocks. Features of the system architectures associated with FIGS. 1-9 can be combined to form new architectures. For example, a system can be structured as a combination of system 400 of FIG. 4 and system 500 of FIG. 5 in parallel with each other. In an embodiment, process head node 406 of FIG. 4 and process head node 506 of FIG. 5 may be realized as a single head node to control operation of a system structured as system 400 in parallel system 500. Other combinations can be implemented.

In addition, each type processing node can be implemented with respect to a type of processor. Each processing node may include or have access to a memory unit. A memory unit can be realized as a machine-readable storage device that can comprise instructions, data, and/or metadata stored thereon, which, when executed by one or more processors cause performance of operations. Further, a memory unit such as a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The memory unit may be a memory module. While memory module may be implemented as a single unit in some application, terms such as "memory module," "machine-readable medium," "machine-readable device," and similar terms should be taken to include all forms of storage media, either in the form of a single medium (or device) or multiple media (or devices), in all forms.

Figure 10:
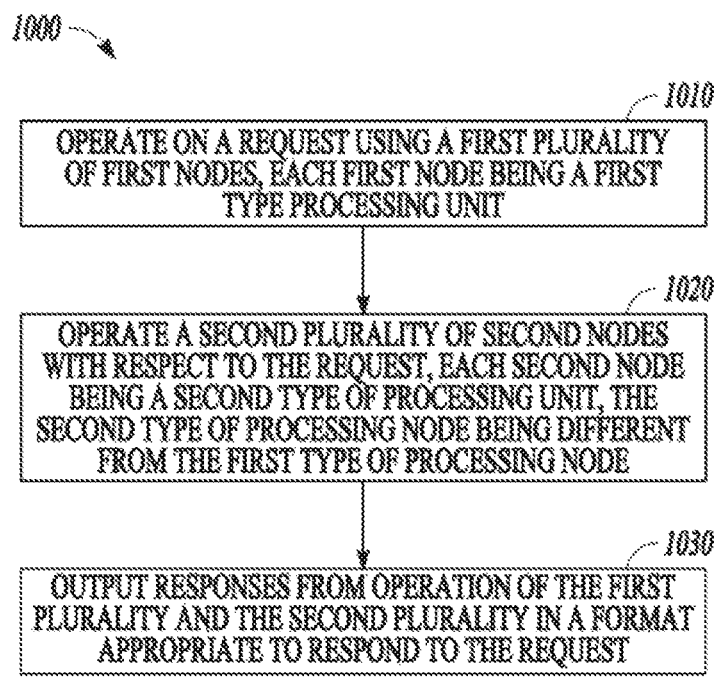
FIG. 10 is a flow diagram of features of an example method using parallel, distributed processing in a heterogeneous, distributed environment, in accordance with various embodiments.

FIG. 10 is a flow diagram of features of an embodiment of an example method 1000. At 1010, a request is operated on using a first plurality of first nodes, each first node being a first type of processing unit. Each first node can operate in parallel with the other first nodes of the first plurality, where each first node is operable to respond directly to the request by examining data and/or metadata it holds against the request. At 1020, a second plurality of second nodes is operated on with respect to the request, each second node being a second type of processing unit with the second type of processing node being different from the first type of processing node. Each second node can operate in parallel with the other second nodes of the second plurality. Each second node can be structured to be operable to respond to the request using data and/or metadata it holds and/or operable in response to data and/or metadata from one or more of the first nodes. At 1030, responses are output from operation of the first plurality and the second plurality in a format appropriate to respond to the request.

Various architectures or combination of architectures of systems similar or identical to the architectures associated with any of FIGS. 1-9 or combinations thereof can be implemented to perform method 1000 or portions thereof. Method 1000 or methods similar to method 1000 can include using transformations to provide data and/or metadata from the first plurality of first nodes to the second plurality of second nodes. The transformations may include, but are not limited to, appropriate filters and maps. Method 1000 or methods similar to method 1000 can include receiving all requests in a first process head node, coordinating processing of the first plurality of first nodes by the first process head node; and coordinating processing of the second plurality of second nodes by a second process head node.

Variations of method 1000 or methods similar to method 1000 can include coordinating processing of the first plurality of first nodes by a first process head node; coordinating processing of the second plurality of second nodes by a second process head node; and receiving the request at a request broker node and providing the request to the first plurality of first nodes from the request broker node. Such methods can include triggering the first process head node to start appropriate transformations with respect to responding to the request by a first available first node of the first plurality of first nodes to receive the request from the request broker node.

Method 1000 and/or variations of method 1000 or methods similar to method 1000 can include coordinating processing of the first plurality of first nodes by a first process head node; receiving the request and distributing the request to selected first nodes of the first plurality of first nodes; receiving data and/or metadata from the selected first nodes at selected second nodes of the second plurality of second nodes; compositing results of operation of the selected second nodes; and generating an output from compositing the results directly from the second nodes. Receiving data and/or metadata from the selected first nodes at selected second nodes of the second plurality of second nodes can include receiving the data and/or metadata with each of the selected second nodes arranged in a one-to-one relationship with a respective selected first node. In various implementations, each selected first node can be arranged with a data hypercube different from the data hypercubes of the other selected first nodes. In an implementation, receiving data and/or metadata from the selected first nodes at selected second nodes of the second plurality of second nodes can include receiving the data and/or metadata with the selected second nodes distributed in a plurality of sets of selected second nodes, each set of selected second nodes arranged in a one-to-one relationship with a respective selected first node. In another implementation, receiving data and/or metadata from the selected first nodes at selected second nodes of the second plurality of second nodes can include receiving the data and/or metadata with the selected first nodes distributed in a plurality of sets of selected first nodes, each set of selected first nodes arranged in a one-to-one relationship with a respective selected second node. In various implementations, generating the output can include generating the output as an image directly from the second nodes.

Method 1000 and/or variations of method 1000 or methods similar to method 1000 can include providing the selected first node to which each selected second node is in the one-to-one relationship with a data hypercube resultant from operation of the respective selected second node. Such methods can include operating a process head node arranged in a server-side distributed system including: coordinating processing of the first plurality of first nodes by the process head node, the process head node arranged with respect to a predictive model of an N-dimensional hypercube of data and/or metadata, the N-dimensional hypercube of data and/or metadata being distributed among the first nodes of the first plurality of first nodes; streaming to a client a delta of hyper dimensionality and/or data and/or metadata with respect to a hypercube of data and/or metadata stored in the client, the delta being a difference between what the client has and what the client needs, the delta based on hypercubes of data and/or metadata provided by operation of the plurality of second nodes in response to mapping from the plurality of first nodes; and receiving feedback from the client as input to the predictive model to operatively reduce the dimensionality of the N-dimensional hypercube of data and/or metadata based on the feedback. The N-dimensional hypercube on the server-side can be equal to or larger than the hypercube stored on the client.

Similar to the system architectures associated with FIGS. 1-9 being used as building blocks, methods associated with the system architectures associated with FIGS. 1-9 can be used as building blocks for processing. Features of processing associated with FIGS. 1-9 can be combined to form new processing procedures.

The structures and procedures, as taught herein allow for heterogeneous parallelization of processing. The structures and procedures, as taught herein, allow for heterogeneous, distributed hardware and software environments. Such structures and procedures decouple data of consumer and producers for easier implementations of new hardware devices or software languages. Heterogeneous hardware environments optimize cost by utilizing expensive and/or specialized hardware components (for example, GPUs) at quantities necessary for the compute. Optimized network load may be attained by utilizing parallelized transport.

Distributed and elastic compute and visualization can be a critical piece of providing a cloud-based infrastructure. Effective use of available hardware components and software technologies is equally important. Combining these two needs to provide a heterogeneous, distributed, elastic platform can create a compute/visualization environment not, currently, in existence, for example in the oil & gas space.

The following are example embodiments of methods and systems in accordance with the teachings herein.

A system 1 can comprise: a request input; a first plurality of first nodes, each first node being a first type of processing unit, each first node operable in parallel with the other first nodes of the first plurality, each first node operable to respond directly to a request by examining data and/or metadata it holds against the request; a second plurality of second nodes, each second node being a second type of processing unit, each second node operable in parallel with the other second nodes of the second plurality, each second node operable to respond to the request using examining data and/or metadata it holds and/or operable in response to data and/or metadata from one or more of the first nodes, the second type of processing node being different from the first type of processing node; and an output to send responses from operation of the first plurality and the second plurality in a format appropriate to respond to the request.

A system 2 can include elements of system 1 and can include transformations to provide data and/or metadata from the first plurality of first nodes to the second plurality of second nodes.

A system 3 can include elements of any of systems 1-2 and can include a first process head node to coordinate processing of the first plurality of first nodes, the first process head node arranged to receive all requests; and a second process head node to coordinate processing of the second plurality of second nodes.

A system 4 can include elements of any of systems 1-3 and can include a first process head node to coordinate processing of the first plurality of first nodes; a second process head node to coordinate processing of the second plurality of second nodes; and a request broker node to receive the request from the second plurality of second nodes and to provide the request to the first plurality of first nodes.

A system 5 can include elements of system 4 and elements of any of systems 1-3 and can include the first node of the first plurality of first nodes being arranged such that a first available first node to receive the request from the request broker node is operable to trigger the first process head node to start appropriate transformations with respect to respond to the request.

A system 6 can include elements of any of systems 1-5 and can include a first process head node arranged to coordinate processing of the first plurality of first nodes and to receive the request and distribute the request to selected first nodes of the first plurality of first nodes; selected second nodes of the second plurality of second nodes arranged to receive data and/or metadata from the selected first nodes; and a composite node to generate an output from compositing results of operation of the selected second nodes.

A system 7 can include elements of system 6 and elements of any of systems 1-5 and can include each of the selected second nodes being arranged in a one-to-one relationship with a respective selected first node.

A system 8 can include elements of system 7 and elements of any of systems 1-6 and can include each selected first node being arranged with a data hypercube different from the data hypercubes of the other selected first nodes and conversion occurs on the selected second nodes.

A system 9 can include elements of system 8 and elements of any of systems 1-7 and can include each selected second node being arranged to provide the selected first node to which it is in the one-to-one relationship with a data hypercube resultant from operation of the respective selected second node.

A system 10 can include elements of system 6 and elements of any of systems 1-5 and 7-9 and can include the selected second nodes being distributed in a plurality of sets of selected second nodes, each set of selected second nodes arranged in a one-to-one relationship with a respective selected first node.

A system 11 can include elements of system 6 and elements of any of systems 1-5 and 7-10 and can include the selected first nodes being distributed in a plurality of sets of selected first nodes, each set of selected first nodes arranged in a one-to-one relationship with a respective selected second node.

A system 12 can include elements of system 6 and elements of any of systems 1-5 and 7-11 and can include the composite node being arranged to generate the output as an image directly from the second nodes.

A system 13 can include elements of system 9 and elements of any of systems 1-8 and 10-12 and can include the system being arranged as a server-side distributed system including a process head node arranged to: coordinate processing of the first plurality of first nodes, the process head node arranged with respect to a predictive model of an N-dimensional hypercube of data and/or metadata, the N-dimensional hypercube of data and/or metadata being distributed among the first nodes of the first plurality of first nodes; stream to a client a delta of hyper dimensionality and/or data and/or metadata with respect to a hypercube of data and/or metadata stored in the client, the delta being a difference between what the client has and what the client needs, the delta based on hypercubes of data and/or metadata provided by operation of the plurality of second nodes in response to mapping from the plurality of first nodes; and receive feedback from the client as input to the predictive model to operatively reduce the dimensionality of the N-dimensional hypercube of data and/or metadata based on the feedback.

A system 14 can include elements of system 13 and elements of any of systems 1-12 and can include the N-dimensional hypercube on the server-side being equal to or larger than the hypercube stored on the client.

A method 1 can comprise: operating on a request using a first plurality of first nodes, each first node being a first type of processing unit, each first node operating in parallel with the other first nodes of the first plurality, each first node operable to respond directly to the request by examining data and/or metadata it holds against the request; operating a second plurality of second nodes with respect to the request, each second node being a second type of processing unit, each second node operating in parallel with the other second nodes of the second plurality, each second node operable to respond to the request using data and/or metadata it holds and/or operable in response to data and/or metadata from one or more of the first nodes, the second type of processing node being different from the first type of processing node; and outputting responses from operation of the first plurality and the second plurality in a format appropriate to respond to the request.

A method 2 can include elements of method 1 and can include using transformations to provide data and/or metadata from the first plurality of first nodes to the second plurality of second nodes.

A method 3 can include elements of any of methods 1-2 and can include receiving all requests in a first process head node; coordinating processing of the first plurality of first nodes by the first process head node; and coordinating processing of the second plurality of second nodes by a second process head node.

A method 4 can include elements of any of methods 1-3 and can include coordinating processing of the first plurality of first nodes by a first process head node; coordinating processing of the second plurality of second nodes by a second process head node; and receiving the request at a request broker node and providing the request to the first plurality of first nodes from the request broker node.

A method 5 can include elements of method 4 and elements of any of methods 1-3 and can include triggering the first process head node to start appropriate transformations with respect to responding to the request by a first available first node of the first plurality of first nodes to receive the request from the request broker node.

A method 6 can include elements of any of methods 1-5 and can include coordinating processing of the first plurality of first nodes by a first process head node; receiving the request and distributing the request to selected first nodes of the first plurality of first nodes; receiving data and/or metadata from the selected first nodes at selected second nodes of the second plurality of second nodes; compositing results of operation of the selected second nodes; and generating an output from compositing the results directly from the second nodes.

A method 7 can include elements of method 6 and elements of any of methods 1-5 and can include receiving data and/or metadata from the selected first nodes at selected second nodes of the second plurality of second nodes to include receiving the data and/or metadata with each of the selected second nodes arranged in a one-to-one relationship with a respective selected first node.

A method 8 can include elements of method 7 and elements of any of methods 1-6 and can include each selected first node being arranged with a data hypercube different from the data hypercubes of the other selected first nodes.

A method 9 can include elements of method 8 and elements of any of methods 1-7 and can include providing the selected first node to which each selected second node is in the one-to-one relationship with a data hypercube resultant from operation of the respective selected second node.

A method 10 can include elements of method 6 and elements of any of methods 1-5 and 7-9 and can include receiving data and/or metadata from the selected first nodes at selected second nodes of the second plurality of second nodes to include receiving the data and/or metadata with the selected second nodes distributed in a plurality of sets of selected second nodes, each set of selected second nodes arranged in a one-to-one relationship with a respective selected first node.

A method 11 can include elements of method 6 and elements of any of methods 1-5 and 7-10 and can include receiving data and/or metadata from the selected first nodes at selected second nodes of the second plurality of second nodes to include receiving the data and/or metadata with the selected first nodes distributed in a plurality of sets of selected first nodes, each set of selected first nodes arranged in a one-to-one relationship with a respective selected second node.

A method 12 can include elements of method 6 and elements of any of methods 1-5 and 7-11 and can include generating the output to include generating the output as an image directly from the second nodes.

A method 13 can include elements of method 9 and elements of any of methods 1-8 and 10-12 and can include operating a process head node arranged in a server-side distributed system to include: coordinating processing of the first plurality of first nodes by the process head node, the process head node arranged with respect to a predictive model of an N-dimensional hypercube of data and/or metadata, the N-dimensional hypercube of data and/or metadata being distributed among the first nodes of the first plurality of first nodes; streaming to a client a delta of hyper dimensionality and/or data and/or metadata with respect to a hypercube of data and/or metadata stored in the client, the delta being a difference between what the client has and what the client needs, the delta based on hypercubes of data and/or metadata provided by operation of the plurality of second nodes in response to mapping from the plurality of first nodes; and receiving feedback from the client as input to the predictive model to operatively reduce the dimensionality of the N-dimensional hypercube of data and/or metadata based on the feedback.

A method 14 can include elements of method 13 and elements of any of methods 1-12 and can include the N-dimensional hypercube on the server-side being equal to or larger than the hypercube stored on the client.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system comprising:
    a request input;
    a first plurality of first nodes, each first node being a first type of processing unit, each first node operable in parallel with the other first nodes of the first plurality, each first node operable to respond directly to a request by examining data and/or metadata it holds against the request;
    a second plurality of second nodes, each second node being a second type of processing unit, each second node operable in parallel with the other second nodes of the second plurality, each second node operable to respond to the request using data and/or metadata it holds and/or operable in response to data and/or metadata from one or more of the first nodes, the second type of processing node being different from the first type of processing node;
    a first process head node arranged to coordinate processing of the first plurality of first nodes and to receive the request and distribute the request to selected first nodes of the first plurality of first nodes;
    selected second nodes of the second plurality of second nodes arranged to receive data and/or metadata from the selected first nodes, wherein each of the selected second nodes is arranged in a one-to-one relationship with a respective selected first node; and an output to send responses from operation of the first plurality and the second plurality in a format appropriate to respond to the request.

2. The system of claim 1, wherein the system includes transformations to provide data and/or metadata from the first plurality of first nodes to the second plurality of second nodes.

3. The system of claim 1, wherein the system includes:
a second process head node to coordinate processing of the second plurality of second nodes, and a request broker node to receive the request from the second plurality of second nodes and to provide the request to the first plurality of first nodes; or
a composite node to generate an output from compositing results of operation of the selected second nodes.

4. The system of claim 3, wherein a first node of the first plurality of first nodes are arranged such that a first available first node to receive the request from the request broker node is operable to trigger the first process head node to start appropriate transformations with respect to respond to the request.

5. The system of claim 1, wherein each selected first node is arranged with a data hypercube different from the data hypercubes of the other selected first nodes and conversion occurs on the selected second nodes.

6. The system of claim 5, wherein each selected second node is arranged to provide the selected first node to which it is in the one-to-one relationship with a data hypercube resultant from operation of the respective selected second node.

7. The system of claim 3, wherein:
the selected second nodes are distributed in a plurality of sets of selected second nodes, each set of selected second nodes arranged in a one-to-one relationship with a respective selected first node;
the selected first nodes are distributed in a plurality of sets of selected first nodes, each set of selected first nodes arranged in a one-to-one relationship with a respective selected second node; or
the composite node is arranged to generate the output as an image directly from the second nodes.

8. The system of claim 6, wherein the system is arranged as a server-side distributed system including a process head node arranged to:
coordinate processing of the first plurality of first nodes, the process head node arranged with respect to a predictive model of an N-dimensional hypercube of data and/or metadata, the N-dimensional hypercube of data and/or metadata being distributed among the first nodes of the first plurality of first nodes;
stream to a client a delta of hyper dimensionality and/or data and/or metadata with respect to a hypercube of data and/or metadata stored in the client, the delta being a difference between what the client has and what the client needs, the delta based on hypercubes of data and/or metadata provided by operation of the plurality of second nodes in response to mapping from the plurality of first nodes; and
receive feedback from the client as input to the predictive model to operatively reduce the dimensionality of the N-dimensional hypercube of data and/or metadata based on the feedback.

9. The system of claim 8, wherein the N-dimensional hypercube on the server-side is equal to or larger than the hypercube stored on the client.

10. A method comprising:
operating on a request using a first plurality of first nodes, each first node being a first type of processing unit, each first node operating in parallel with the other first nodes of the first plurality, each first node operable to respond directly to the request by examining data and/or metadata it holds against the request;
operating a second plurality of second nodes with respect to the request, each second node being a second type of processing unit, each second node operating in parallel with the other second nodes of the second plurality, each second node operable to respond to the request using data and/or metadata it holds and/or operable in response to data and/or metadata from one or more of the first nodes, the second type of processing node being different from the first type of processing node;
coordinating processing of the first plurality of first nodes by a first process head node;
receiving the request and distributing the request to selected first nodes of the first plurality of first nodes;
receiving data and/or metadata from the selected first nodes at selected second nodes of the second plurality of second nodes, wherein receiving data and/or metadata from the selected first nodes at selected second nodes of the second plurality of second nodes includes receiving the data and/or metadata with each of the selected second nodes arranged in a one-to-one relationship with a respective selected first node; and
outputting responses from operation of the first plurality and the second plurality in a format appropriate to respond to the request.

11. The method of claim 10, wherein the method includes using transformations to provide data and/or metadata from the first plurality of first nodes to the second plurality of second nodes.

12. The method of claim 10, wherein the method includes:
coordinating processing of the second plurality of second nodes by a second process head node, and receiving the request at a request broker node and providing the request to the first plurality of first nodes from the request broker node; or
compositing results of operation of the selected second nodes, and generating an output from compositing the results directly from the second nodes.

13. The method of claim 12, wherein the method includes triggering the first process head node to start appropriate transformations with respect to responding to the request by a first available first node of the first plurality of first nodes to receive the request from the request broker node.

14. The method of claim 12, wherein:
receiving data and/or metadata from the selected first nodes at selected second nodes of the second plurality of second nodes includes receiving the data and/or metadata with the selected second nodes distributed in a plurality of sets of selected second nodes, each set of selected second nodes arranged in a one-to-one relationship with a respective selected first node;
receiving data and/or metadata from the selected first nodes at selected second nodes of the second plurality of second nodes includes receiving the data and/or metadata with the selected first nodes distributed in a plurality of sets of selected first nodes, each set of selected first nodes arranged in a one-to-one relationship with a respective selected second node; or generating the output includes generating the output as an image directly from the second nodes.

15. The method of claim 14, wherein each selected first node is arranged with a data hypercube different from the data hypercubes of the other selected first nodes.

16. The method of claim 15, wherein the method includes providing the selected first node to which each selected second node is in the one-to-one relationship with a data hypercube resultant from operation of the respective selected second node.

17. The method of claim 16, wherein the method includes operating a process head node arranged in a server-side distributed system including:

coordinating processing of the first plurality of first nodes by the process head node, the process head node arranged with respect to a predictive model of an N-dimensional hypercube of data and/or metadata, the N-dimensional hypercube of data and/or metadata being distributed among the first nodes of the first plurality of first nodes;

streaming to a client a delta of hyper dimensionality and/or data and/or metadata with respect to a hypercube of data and/or metadata stored in the client, the delta being a difference between what the client has and what the client needs, the delta based on hypercubes of data and/or metadata provided by operation of the plurality of second nodes in response to mapping from the plurality of first nodes; and receiving feedback from the client as input to the predictive model to operatively reduce the dimensionality of the N-dimensional hypercube of data and/or metadata based on the feedback.

18. The method of claim 17, wherein the N-dimensional hypercube on the server-side is equal to or larger than the hypercube stored on the client.

* * * * *